United States Patent Office 3,738,843
Patented June 12, 1973

3,738,843
PREPARATION OF COOKED CANDIES
Robert R. Frey, Huntingdon Valley, Pa., assignor to Richardson-Merrell Inc., New York, N.Y.
No Drawing. Filed Mar. 30, 1971, Ser. No. 129,569
Int. Cl. A23g 3/00
U.S. Cl. 99—134 R                                2 Claims

ABSTRACT OF THE DISCLOSURE

The gumminess of cooked candies made with arabinogalactan can be reduced by incorporating small amounts of mannitol and/or lactose in the aqueous solution before or during the cooking period.

BACKGROUND OF THE INVENTION

The desirability of providing candies of low caloric value has been appreciated for a long time. Many overweight people, and those having diabetic tendencies, often have a craving for sweet candies and find it difficult to abstain from eating such high calorie products. Since the principal ingredient of most candies is sugar (sucrose), attempts at reducing the caloric content have been made by reducing the amount of sugar used in preparing the candy. Sugar often provides the important physical bulking properties of the product and cannot be simply replaced with high intensity artificial sweeteners. Accordingly, bulking agents such as marine, vegetable and synthetic gums, gelatin, carboxymethyl cellulose and the like have been used to replace all or most of the sugar and other saccharides of the candy. Unfortunately, the physical properties of these natural and synthetic gums do not allow them to be used in substantial amounts in many types of candy.

U.S. Pat. No. 3,294,544, issued Dec. 27, 1966 to George L. Stanko, discloses that arabinogalactan can be used as a sugar substitute for the preparation of many food products including baked goods, icings, candy, ice cream, salad dressings, and the like without development of the undesirable properties often encountered when other gums are used as sugar substitutes. This patent discloses that arabinogalactan is non-digestible and does not contribute calories to food products to which it is added. It may replace sugar on an equal weight basis in many foods and, while it is not sweet, the desired sweetness may be obtained by adding a variety of synthetic or artificial sweetening agents to the food product.

Arabinogalactan is a tasteless, water-soluble polysaccharide which can be extracted from the wood of the western larch tree. It is a highly branched polymer of arabinose and galactose in a ratio of about 1:6, respectively. Its polymeric fractions have a molecular weight range of from about 30,000 to 100,000. The chemical and physical properties of arabinogalactan and methods for extracting it are described in the literature and patents which include U.S. Pats. 2,073,616 to Acree, 3,325,473 to Herrick et al., 3,337,526 to Adams, and 3,509,126 to Dahl.

It has been found that while arabinogalactan is a suitable substitute for sugar on an equal weight basis in many food products, it cannot be used as a simple replacement for sugar in many products. At low concentrations, in aqueous solution, arabinogalactan is quite similar to sugar. However, highly concentrated aqueous solutions of arabinogalactan differ from aqueous solutions of sugar of like concentration, the most profound difference being the high viscosity of the arabinogalactan solution. Cooked candies containing high concentrations of arabinogalactan are rubbery and sticky in contrast to cooked candies made of sugar, which products are short, crisp or friable.

It is not entirely unexpected that aqueous solutions containing high concentrations of arabinogalactan are viscous and gummy. Arabinogalactan is a natural gum having a molecular weight averaging about 60,000, whereas in contrast sucrose has a molecular weight of only 342. The viscosities of aqueous solutions of arabinogalactan and sucrose are very much alike up to about 30% by weight of the solids. However, at concentrations above 40% by weight the viscosity of the arabinogalactan solution increases markedly, as it will be seen in the following table.

TABLE I

[Viscosity (cps.) at 150° F.]

| Concentration | Sucrose solution | Arabinogalactan solution | Ratio |
| --- | --- | --- | --- |
| 40% | 1.5 | 20 | 1:13 |
| 50% | 3 | 165 | 1:55 |
| 60% | 8 | 750 | 1:94 |
| 65% | 15 | 11,000 | 1:730 |

At higher temperatures the increase in viscosity of the arabinogalactan solutions with increased solids content, when compared with similar solutions of sucrose, will be seen in the following table.

TABLE II

[Viscosity (cps.) at 200° F.]

| Concentration | Sucrose solution | Arabinogalactan solution | Ratio |
| --- | --- | --- | --- |
| 50% | 1.8 | 34 | 1:16 |
| 60% | 3.5 | 230 | 1:66 |
| 65% | 5.5 | 1,000 | 1:180 |

At 200° F. a 90% solution of sugar has a viscosity of about 2500 cps. At this viscosity the solution can be stirred and cooked to remove the remaining moisture which is necessary in preparaing many types of candies. Hard candy such as lemon drops, medicated cough drops and the like must, for example, have as little as 1% or 2% moisture if the product is to be clear, shiny, hard, non-hygroscopic and non-sticky. On the other hand, an aqueous solution of arabinogalactan having a viscosity of about 2500 cps. at 200° F. contains only about 67% solids. The 33% moisture can be removed from the arabinogalactan solution with great difficulty and while the product can be flavored with artificial sweeteners, aromatic oils, and the like, to resemble the taste of a sugar-based cooked candy, the resulting product is rubbery and sticky and does not have the short, crisp and friable characteristics of cooked candies made with sucrose.

The present invention is based upon my discovery that the tough, gummy, sticky characteristics of cooked candies containing arabinogalactan in highly concentrated solutions can be controlled and regulated by the addition of mannitol and/or lactose prior to or while the solution is being cooked. By varying the ratio of arabinogalactan to mannitol and/or lactose, many different types and textures of cooked candy can be prepared. For instance, chewy candies such as caramel and toffee can be prepared with arabinogalactan as a substitute for sugar if the cook contains one to one and one-half parts of mannitol or lactose for each 10 parts by weight of arabinogalactan. Brittle candies such as conventional fruit drops and cough lozenges can be made with arabinogalactan in place of sugar when one part of mannitol or lactose is added to the cook for each 6 parts of arabinogalactan. Short candies such as fudge, which are indistinguishable from similar products made with sugar, can be prepared using 1 part of mannitol and/or lactose for each 3 parts of arabinogalactan during the preparation of the candy. Accordingly, the invention contemplates the use of 1 part of mannitol and/or lactose with 2 to 15 parts by weight of arabinogalactan.

The reason that mannitol and/or lactose can regulate or overcome the gumminess of highly concentrated solutions of arabinogalactan is probably due to their limited solubility at low temperatures and their increased solubility at higher temperatures. During the cooking process, the mannitol and/or lactose is dissolved in the hot concentrated arabinogalactan solution and after the desired amount of moisture has been removed, the colors, flavors, medicinal agents and other normal additives are added and the hot candy mass is cooled. During the cooling, some of the mannitol and/or lactose crystallizes, forming discrete particles which interrupt the intermolecular cohesion which makes the concentrated solutions of arabinogalactan gummy. Thus, in chewy candies such as caramel only a small amount of crystallization is required to reduce the gumminess to a level where the resultant candy is still chewy but not objectionably gummy. In short candies such as fudge, a much higher degree of crystallization is required to completely overcome the gumminess of arabinogalactan. It is interesting to note that the addition of finely powdered mannitol and/or lactose to concentrated solutions of arabinogalactan after cooking and cooling does not reduce the gumminess of the product to any noticeable degree.

It is to be understood that the present invention contemplates the further addition to the mannitol and/or lactose-arabinogalactan product of other carbohydrates including sugar, milk solids, fats, proteins, whipping agents, colors, flavors, aromatic oils, medicinal agents, and particularly decongestants, antitussives, and others such as are commonly used in cough drops. These additional agents make it possible to prepare in conventional manner a wide variety of conventional candy products such as hard candies, marshmallows, fudge, nougats, toffees, caramels and other cooked candies which have a reduced amount of sucrose and hence being of reduced calories as a food.

The preparation of a number of different candy types in which mannitol or lactose is used to reduce or eliminate the otherwise objectionable gumminess of the arabinogalactan contained therein is illustrated in the following examples.

EXAMPLE 1

A sugar-free low calorie hard candy is prepared in the following manner:

680 parts of arabinogalactan are dissolved in 800 parts of water. 120 parts of sorbitol solution (70% sorbitol on a dry weight basis) and 140 parts of mannitol are added and then heated in a steam jacketed kettle suitably equipped with an agitator blade and side and bottom scraper blades. The sorbitol is used to give an increased fluidity to the mass and a cool mouth feel in the finished candy. The solution is boiled slowly (cooked) until the water content is reduced to approximately 7%. The resulting "cook" is a thick viscous mass which is scraped from the kettle onto a cooling table. As coloring, flavoring and sweetening agents, .02% FD&C Red #2 (amaranth), .1% limitation cherry flavor, 33% citric acid and .1% sodium saccharin are added while mixing. The candy is formed into the desired shape by passing the hot mass through suitable forming rollers and then cooled to form a hard candy. This product has the same friability characteristics as hard candy prepared with sucrose.

EXAMPLE 2

A low calorie hard candy cough drop is prepared as follows:

650 parts of arabinogalactan are dissolved in 800 parts of water. 100 parts of sucrose and 190 parts of lactose are added. The resulting mix is heated in a steam jacketed kettle suitably equipped with an agitator and side and bottom scraper blades. The solution is boiled slowly with continual agitation and wiping of the sides and bottom with the scraper blade until the water content is reduced to about 7%. Again, the thick viscous mass is scraped from the kettle onto a cooling table. .004% FD&C Yellow #5 (tartrazine), .3% lemon oil, 0.75% menthol, .025% eucalyptus oil, 1% citric acid and .1% sodium saccharin are added while mixing. The cough drops are formed by passing the hot mass through suitable forming rollers and then cooled to form a hard candy.

EXAMPLE 3

A low calorie, sugar-free marshmallow is prepared in the following manner.

410 parts of arabinogalactan are dissolved in 500 parts of water. 120 parts of lactose and 100 parts of mannitol are added. The resulting mix is cooked in a steam jacketed kettle with agitation until the water content is reduced to about 26%. The solution is cooled to about 180° F.—then a solution containing 20 parts of powdered egg whites and 40 parts of water is added. The resulting mix is whipped with a beater type mixer until the resulting mass is stiff and has a density of about 4 lbs. per gallon. .25% vanilla extract. .1% malt extract and .075% sodium saccharin are added. The whip is poured onto lightly greased sheets and allowed to cool. It is then cut into the desired shape. Without having mannitol in the cook, the product is reminiscent of sticky foam rubber.

EXAMPLE 4

A low calorie marshmallow can be prepared in a similar manner as in Example 3 except carbohydrates such as sucrose, dextrose, lactose, invert sugar, high D. E. corn syrups or combinations thereof, can be substituted for the lactose on an equivalent weight basis and 160 parts of mannitol can be used instead of the 100 parts used in the example.

EXAMPLE 5

A low calorie sugar-free chewy candy is prepared as follows:

600 parts of arabinogalactan are dissolved in 700 parts of water—80 parts of lactose and 60 parts of mannitol are added. The resulting mix is then cooked in a steam jacketed kettle with agitation until the water content is reduced to about 15%. 90 parts of hydrogenated coconut oil is added while the cook is still hot. .01% caramel color, .15% imitation caramel flavor, .05% butter flavor, and .1% sodium saccharin are added. The mix is then poured onto a cooled lightly greased surface and allowed to set. It is then rolled and cut into desired pieces in the usual manner.

EXAMPLE 6

A low calorie caramel type chewy candy is prepared as follows:

540 parts of arabinogalactan are dissolved in 600 parts water. 100 parts of non-fat dried milk, 100 parts of vegetable fat (92°) and 110 parts of lactose are added. The resulting mix is cooked in a steam jacketed kettle which agitation until the water content is reduced to about 15%. .1% imitation caramel flavor, .2% vanilla extract and .1% sodium saccharin are added. The mix is then poured onto a cooled, lightly greased surface and allowed to set. It is then rolled and cut into the desired pieces in the usual manner.

EXAMPLE 7

A low calorie fudge is made as follows:

495 parts of arabinogalactan are dissolved in 60 parts of water, 50 parts of non-fat dried milk, 165 parts of mannitol, 40 parts of sugar, 80 parts of vegetable fat (92°) and 30 parts of cocoa powder are added. The resulting mix is cooked in a steam jacketed kettle with agitation until the water content is reduced to about 14%. 1.5% cocoa, .05% vanilla extract, .1% butter flavor and .1% sodium saccharin are added. The mix is cooled while stirring to develop crystallization of the lactose. The thick mix is then spread onto a lightly greased slab and allowed to cool. After cooling, it is cut into the desired pieces.

What is claimed is:

1. A method of preparing candy of reduced sugar content which comprises heating an aqueous solution of the candy components until all are dissolved and the moisture content reduced to a predetermined amount, at least part of the normal amount of sugar being replaced with arabinogalactan so as to provide a solution of at least about 40% by weight of arabinogalactan, the improvement which comprises dissolving mannitol or lactose, or a mixture thereof, in said solution in a ratio of 1 part by weight thereof for each 2 to 15 parts by weight of arabinogalactan contained therein and cooling said solution to cause the mannitol or lactose to precipitate before the arabinogalactan solidifies.

2. A method in accordance with claim 1 in which the candy solution is substantially free of sucrose.

References Cited

UNITED STATES PATENTS 3,294,544   12/1966   Stanko _____ 99—134

OTHER REFERENCES

Speel, H. C., Mannitol and Sorbitol in Pharmacy, the Am. Journ. Pharm., vol. 113, No. 4, April 1941, pp. 4 and 8.

RAYMOND N. JONES, Primary Examiner

J. M. HUNTER, Assistant Examiner